US 7,890,512 B2

(12) United States Patent
Mei et al.

(10) Patent No.: US 7,890,512 B2
(45) Date of Patent: Feb. 15, 2011

(54) AUTOMATIC IMAGE ANNOTATION USING SEMANTIC DISTANCE LEARNING

(75) Inventors: Tao Mei, Beijing (CN); Xian-Sheng Hua, Beijing (CN); Shipeng Li, Beijing (CN); Yong Wang, London (GB)

(73) Assignee: Microsoft Corporation, Redmond, WA (US)

( * ) Notice: Subject to any disclaimer, the term of this patent is extended or adjusted under 35 U.S.C. 154(b) by 443 days.

(21) Appl. No.: 12/136,773

(22) Filed: Jun. 11, 2008

(65) Prior Publication Data
US 2009/0313294 A1 Dec. 17, 2009

(51) Int. Cl.
*G06F 17/30* (2006.01)
(52) U.S. Cl. .................. 707/737; 707/803; 382/224
(58) Field of Classification Search ............. 707/737, 707/803–807, 999.004, 999.005, 999.006, 707/999.007; 382/224
See application file for complete search history.

(56) References Cited

U.S. PATENT DOCUMENTS

| | | | |
|---|---|---|---|
| 7,035,467 B2 * | 4/2006 | Nicponski ............ | 382/224 |
| 7,068,309 B2 | 6/2006 | Toyama et al. | |
| 7,349,895 B2 | 3/2008 | Liu et al. | |
| 2002/0055955 A1 | 5/2002 | Lloyd-Jones et al. | |
| 2004/0205482 A1 * | 10/2004 | Basu et al. .......... | 715/500.1 |
| 2006/0007315 A1 | 1/2006 | Singh | |
| 2006/0029276 A1 * | 2/2006 | Nagahashi et al. ...... | 382/173 |
| 2006/0173909 A1 | 8/2006 | Carlson et al. | |
| 2007/0083492 A1 * | 4/2007 | Hohimer et al. ........... | 707/3 |
| 2007/0293265 A1 | 12/2007 | Fei et al. | |
| 2008/0021928 A1 | 1/2008 | Yagnik | |
| 2008/0114601 A1 * | 5/2008 | Boyle et al. ............ | 704/270 |
| 2009/0154795 A1 * | 6/2009 | Tan et al. ............... | 382/155 |

OTHER PUBLICATIONS

Coherent Image Annotation by Learning Semantic Distance, Tao Mei et al., pp. 1-8, IEEE 2008.*
Carneiro, et al., "Formulating Semantic Image Annotation as a Supervised Learning Problem", IEEE Computer Society Conference on Computer Vision and Pattern Recognition, 2005, pp. 1-6.
Jin, et al., "Effective Automatic Image Annotation Via a Coherent Language Model and Active Learning", Proceedings of the 12th annual ACM international conference on Multimedia, Oct. 10-16, 2004, pp. 892-899.

(Continued)

*Primary Examiner*—Debbie Le
(74) *Attorney, Agent, or Firm*—Lyon & Harr, LLP; Richard T. Lyon

(57) ABSTRACT

Images are automatically annotated using semantic distance learning. Training images are manually annotated and partitioned into semantic clusters. Semantic distance functions (SDFs) are learned for the clusters. The SDF for each cluster is used to compute semantic distance scores between a new image and each image in the cluster. The scores for each cluster are used to generate a ranking list which ranks each image in the cluster according to its semantic distance from the new image. An association probability is estimated for each cluster which specifies the probability of the new image being semantically associated with the cluster. Cluster-specific probabilistic annotations for the new image are generated from the manual annotations for the images in each cluster. The association probabilities and cluster-specific probabilistic annotations for all the clusters are used to generate final annotations for the new image.

20 Claims, 6 Drawing Sheets

OTHER PUBLICATIONS

Monay, et al., "On Image Auto-Annotation with Latent Space Models", Proceedings of the eleventh ACM international conference on Multimedia, Nov. 2-8, 2003, pp. 275-278.

Glotin, et al., "Fast Image Auto-Annotation with Visual Vector Approximation Clusters", Workshop CBMI, 2005, 8 pages.

Carneiro, et al., "A Database Centric View of Semantic Image Annotation and Retrieval", Proceedings of the 28th annual international ACM SIGIR conference on Research and development in information retrieval, Aug. 15-19, 2005, pp. 559-566.

Liu, et al., "An Adaptive Graph Model for Automatic image Annotation", Proceedings of the 8th ACM international workshop on Multimedia information retrieval, Oct. 26-27, 2006, pp. 61-69.

Ng, et al., "On Spectral Clustering: Analysis and an Algorithm", . Advances in Neural Information Processing Systems (NIPS) 14, 2002, 8 pages.

"Gaussian Mixture Models", http://www.autonlab.org/tutorials/gmm.html.

S. Towers, "Kernel Probability Density Estimation Methods", Prepared for Conference on Advanced Statistical Techniques in Partide Physics, Durham, May 18-22, 2002, pp. 107-111.

Barnard, et al., "Matching words and pictures", Journal of Machine Learning Research, 2003, pp. 1107-1135.

Cortes, et al., "Support-vector networks", Machine Learning, 1995, 20(3), pp. 273-297.

Datta, et al., "Image retrieval: Ideas, influences, and trends of the new age", ACM Computing Surveys, vol. 40, No. 2, Article 5, Apr. 2008, pp. 5:1-5:60.

Feng, et al., "Multiple bernoulli relevance models for image and video annotation", in Proceedings of CVPR, Jun. 2004, pp. 1002-1009.

He, et al., "Generalized manifold ranking based image retrieval", . IEEE Transaction on Image Processing, 2006, pp. 3170-3177.

Jeon, et al., "Automatic image annotation and retrieval using cross-media relevance models", In Proceedings of SIGIR, 2003, pp. 119-126.

"Photography image database", http://www.stat.psu.edu/~jiali/index.download.html.

Jia Li, "A mutual semantic endorsement approach to image retrieval and context provision", In Proceedings of ACM international workshop on Multimedia information retrieval, 2005, pp. 173-182.

Li, et al., "Automatic linguistic indexing of pictures by a statistical modeling approach", IEEE Transactions on Pattern Analysis and Machine Intelligence, vol. 25, No. 9, Sep. 2003, pp. 1075-1088.

Li, et al., "Image annotation by large-scale content-based image retrieval", in Proceedings of ACM Multimedia, 2006, pp. 607-610.

Pelleg, et al., "Extending K-means with efficient estimation of the number of clusters", In Proceedings of International Conference on Machine Learning, 2000, pp. 727-734.

Roth, et al., "Optimal cluster preserving embedding of nonmetric proximity data", IEEE Trans. on Pattern Analysis and Machine Intelligence, 25(12): 2003, pp. 1540-1551.

Rui, et al., "A search-based web image annotation method", In Proceedings of ICME, 2007, pp. 655-658.

Smeulders, et al., "Content based image retrieval at the end of the early years", IEEE Trans. on Pattern Analysis and Machine Intelligence, 2000, pp. 1349-1380.

Wang, et al., "Automatic video annotation by semisupervised learning with kernel density estimation", In Proceedings of ACM Multimedia, 2006, pp. 967-976.

Wang, et al., "Annosearch: Image autoannotation by search", In Proceedings of CVPR, 2006, pp. 1483-1490.

Wu, et al., "Formulating context-dependent similarity functions", Proceedings of ACM Multimedia, 2005, pp. 725-734.

Yang, et al., "Region-based image annotation using asymmetrical support vector machine-based multiple-instance learning", . In Proceedings of CVPR, 2006, pp. 2057-2063.

Yu, et al., "Toward robust disance metric analysis for similarity estimation", In Proceedings of CVPR, 2006, pp. 316-322.

* cited by examiner

| Annotation Algorithm Type | Keyword Annotations Applied |
|---|---|
| Manual (Ground Truth) | Trunk, Waterfall, Mountain, Sunrise |
| AIA Algorithm 1 | Mountain, Clouds, Street Garden |
| AIA Algorithm 2 | Tree, Water, Clouds, Sun |

AUTOMATIC IMAGE ANNOTATION USING SEMANTIC DISTANCE LEARNING

BACKGROUND

Rapid advances in digital imaging technology in recent years have resulted in a significant decrease in the cost of image capture and display devices, and a corresponding surge in the prevalence of these devices. For example, image capture functionality is now available to consumers on a mass market level in a variety of different forms such as mobile phones, digital cameras, web cameras and the like. Additionally, laptop computers are also now available with integrated web cameras. As a result, in recent years the quantity of digital image data being captured has surged to an unprecedented level. Corollary advances in data storage and network communications technologies have made it possible for mass market consumers to cost effectively store and communicate this image data to others. A wide variety of mass market software applications also now exist which conveniently provide consumers with the ability to view, manipulate and share this image data for a variety of different purposes.

SUMMARY

This Summary is provided to introduce a selection of concepts, in a simplified form, that are further described hereafter in the Detailed Description. This Summary is not intended to identify key features or essential features of the claimed subject matter, nor is it intended to be used as an aid in determining the scope of the claimed subject matter.

Automatic image annotation (AIA) technique embodiments described herein generally provide for the automatic annotation of an image using semantic distance learning. In an exemplary embodiment, a technique is provided which automatically annotates a new image. A set of training images is first input, where the new image is not in the set of training images. Each training image is then manually annotated with a vector of keyword annotations. The set of training images is then partitioned into a plurality of semantic clusters of training images, where each cluster contains training images that are semantically similar, and each training image is partitioned into a single cluster. A semantic distance function (SDF) is then learned for each cluster. The SDF for each cluster is then used to compute a pair-wise feature-based semantic distance score between the new image and each training image in the cluster, resulting in a set of pair-wise feature-based semantic distance scores for the cluster, where each feature-based score in the set specifies a metric for an intuitive semantic distance between the new image and a particular training image in the cluster. The set of pair-wise feature-based semantic distance scores for each cluster is then used to generate a ranking list for the cluster which ranks each training image in the cluster according to its intuitive semantic distance from the new image. A cluster association probability is then estimated for each cluster which specifies the probability of the new image being semantically associated with the cluster. For each cluster, the vector of keyword annotations for each training image in the cluster is then probabilistically propagated to the new image, resulting in a cluster-specific vector of probabilistic annotations for the new image. Finally, the cluster association probabilities and cluster-specific vectors of probabilistic annotations for all the clusters are used to generate a vector of final keyword annotations for the new image. Given a database of images which have been annotated by the AIA technique described herein, when a user desires to search through the database and retrieve particular images therefrom that contain particular visual features, the keyword annotations generated for the images can be used to improve the efficiency and precision of the image retrieval process by converting the image searching/retrieval process to a text-based keyword searching/retrieval process.

Semantic relative comparative score (RCS) technique embodiments described herein generally provide for a way to compare the annotation precision of two different AIA algorithms. In an exemplary embodiment, a technique is provided which compares the annotation precision of two different AIA algorithms. A set of images is input. Ground-truth keyword annotations are then manually applied to each image in the set. A first AIA algorithm is then used to automatically generate first keyword annotations for each image in the set, and a second AIA algorithm is used to automatically generate second keyword annotations for each image in the set. Then, a first pair-wise semantic distance score is computed which specifies a metric for the semantic distance between the first keyword annotations and the ground-truth keyword annotations, and a second pair-wise semantic distance score is computed which specifies a metric for the semantic distance between the second keyword annotations and the ground-truth keyword annotations. Finally, a semantic relative comparative score is generated which compares the annotation precision of the first and second AIA algorithms by first determining the number of images in the set for which the first score is less than the second score, and then dividing this number of images by the total number of images in the set.

In addition to the just described benefit, other advantages of the AIA technique and semantic RCS technique embodiments described herein will become apparent from the detailed description which follows hereafter when taken in conjunction with the drawing figures which accompany the detailed description.

DESCRIPTION OF THE DRAWINGS

The specific features, aspects, and advantages of the automatic image annotation (AIA) technique and semantic relative comparative score (RCS) technique embodiments described herein will become better understood with regard to the following description, appended claims, and accompanying drawings where:

DETAILED DESCRIPTION

Figure 1:
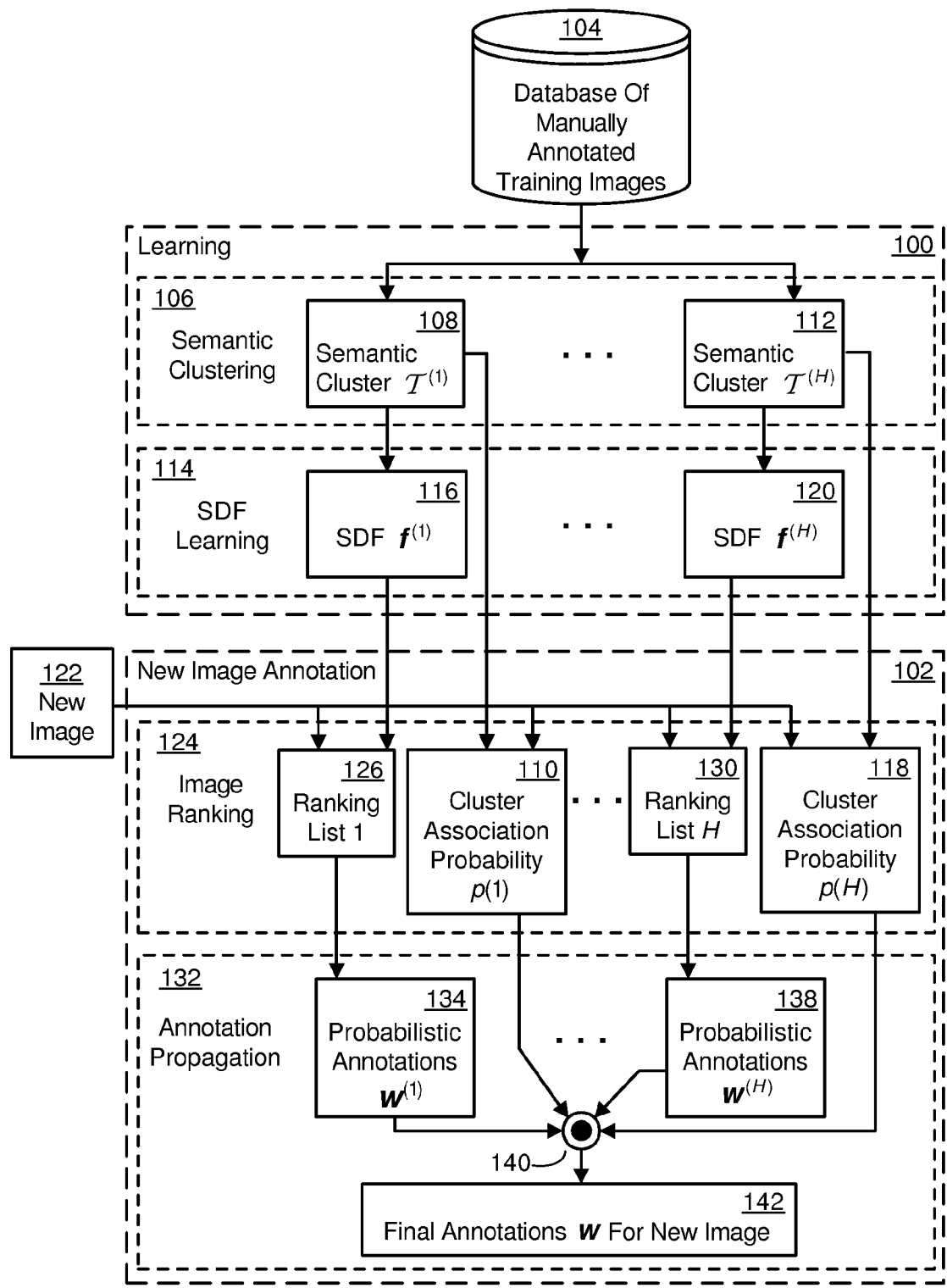
FIG. 1 illustrates a diagram of an exemplary embodiment, in simplified form, of a multistage procedure for AIA using semantic distance learning.

In the following description of automatic image annotation (AIA) technique and semantic relative comparative score (RCS) technique embodiments, reference is made to the accompanying drawings which form a part hereof, and in which are shown, by way of illustration, specific embodiments in which the techniques can be practiced. It is understood that other embodiments can be utilized and structural changes can be made without departing from the scope of the AIA technique and semantic RCS technique embodiments.

1.0 Overview of AIA Using Semantic Distance Learning

As is appreciated in the art of digital image processing, image annotation generally refers to a method for tagging (hereafter referred to as annotating) an image with metadata in the form of textual keywords (hereafter referred to simply as keywords) that describe one or more low-level visual features (hereafter referred to simply as features) in the image. Additionally, AIA generally refers to a method for automatically generating these keyword metadata tags (hereafter referred to as keyword annotations or simply annotations) for a specific image. This section provides a basic overview of the AIA technique embodiments.

A set $\mathcal{T}$ of manually annotated training images can be given by the equation $\mathcal{T}=\{x_1, x_2, \ldots, x_n\}$, where $x_i$ is a feature vector that describes the features in the i-th training image (hereafter denoted as $TI_i$) and n is the total number of training images in $\mathcal{T}$. A set $\mathcal{A}$ of associated keyword annotations which have been manually applied to each training image in $\mathcal{T}$ can be given by the equation $\mathcal{A}=\{t_1, t_2, \ldots, t_n\}$, where $t_i$ is a vector of keyword annotations which have been manually applied to $TI_i$. It is noted that this set $\mathcal{A}$ of keyword annotations are considered herein to be the ground-truth annotations for the training images. Given a prescribed vocabulary of keywords where each keyword in the vocabulary describes a different feature, a probability $t_i(j)$ of annotating $TI_i$ with the j-th keyword in the vocabulary can be given as follows. If $TI_i$ is annotated with the j-th keyword in the vocabulary, then $t_i(j)=1$, otherwise $t_i(j)=0$.

As is appreciated in the art of image annotation, a specific image can either be annotated with a single keyword or a plurality of keywords. In cases where a plurality of keyword annotations are applied to a particular training image, the total number of keyword annotations that are applied to the image is generally relatively small. In tested embodiments of the AIA technique, each training image in $\mathcal{T}$ was manually annotated with between one and five different keywords, and a conventional Corel keyword database was employed for the vocabulary of keywords. Generally speaking, the AIA technique embodiments described herein use semantic distance learning to automatically generate a vector w of keyword annotations for a new image that is not in $\mathcal{T}$. A probability w(j) of associating the j-th keyword in the vocabulary to the new image can be given by the equation $w(j) \in [0,1]$.

FIG. 1 illustrates a diagram of an exemplary embodiment, in simplified form, of a multistage procedure for AIA using semantic distance learning. As depicted in FIG. 1, the procedure generally includes a learning phase 100 followed by a new image annotation phase 102. A database 104 stores the digital image data for the aforementioned set $\mathcal{T}$ of manually annotated training images and their associated set $\mathcal{A}$ of keyword annotations.

Referring again to FIG. 1, the learning phase 100 generally operates as follows. First, a semantic clustering stage 106 partitions the set of training images in the database 104 into a plurality of semantic clusters of training images 108/112, where each semantic cluster contains training images that are semantically similar. In other words, the semantic clustering stage 106 operates to partition an overall semantic space into a plurality of semantic sub-spaces. It is noted that the semantic clustering stage 106 operates such that each training image in the database 104 is partitioned into a single semantic cluster 108/112. Once the semantic clustering stage 106 has been completed, a semantic distance function (SDF) learning stage 114 learns an SDF $f^{(i)}$ 116/120 for each semantic cluster of training images 108/112, where $f^{(i)}$ is the SDF that is learned for the i-th semantic cluster of training images. Generally speaking, the learned SDF $f^{(i)}$ measures a degree of semantic similarity between pairs of training images in the i-th semantic cluster.

Referring again to FIG. 1, once the learning phase 100 has been completed, the new image annotation phase 102 generally operates as follows. A new image 122, which is not in the set $\mathcal{T}$ of manually annotated training images in the database 104, can be automatically annotated in the following manner. First, for each semantic cluster of training images 108/112, an image ranking stage 124 generally operates as follows. The SDF $f^{(i)}$ 116/120 which was learned for the cluster 108/112 can be used to compute a pair-wise feature-based semantic distance score between the new image 122 and each training image in the cluster, resulting in a set of pair-wise feature-based semantic distance scores for the cluster. Each feature-based score in this set of scores specifies a metric for an intuitive semantic distance between the new image 122 and a particular training image in the cluster 108/112. The set of scores can then be used to generate a ranking list 126/130 which ranks each training image in the cluster 108/112 according to its intuitive semantic distance from the new image 122. A cluster association probability p(i) 110/118 can then be estimated for each cluster 108/112 which specifies the probability of the new image being semantically associated with the cluster. Once the image ranking stage 124 has been completed, for each semantic cluster of training images 108/112, an annotation propagation stage 132 generally operates as follows. The keyword annotations $t_i$ for each training image in the cluster 108/112 are probabilistically propagated to the new image 122, resulting in a cluster-specific vector $w^{(i)}$ of probabilistic annotations 134/138 for the new image. A vector w of final keyword annotations for the new image 142 can then be generated by using the cluster association probability p(i) 110/118 for each semantic cluster of training images 108/112 to combine 140 the cluster-specific vectors $w^{(i)}$ of probabilistic annotations 134/138 from all the clusters.

Referring again to FIG. 1, a detailed description of exemplary embodiments of the semantic clustering stage 106, SDF learning stage 114, image ranking stage 124, and annotation propagation stage 132 will now be provided. As will be appreciated from the detailed descriptions which follow, the AIA technique embodiments described herein are advantageous for a number of different reasons including, but not limited to, the following. The AIA technique embodiments don't judge semantic similarity between images based simply upon visual similarity between the images in a high dimensional Euclidean space. Rather, the AIA technique embodiments judge semantic similarity between images based upon their keyword annotations $t_i$ taken as a whole entity. Thus, the AIA technique embodiments improve the precision of the final keyword annotations w for the new image 142 because annotation "noise" introduced by a false match (i.e. two images which are visually similar but semantically dissimilar) does not propagate through the learning 100 and new image annotation 102 phases. Furthermore, the final keyword annotations w which are generated for the new image 142 are semantically coherent. Additional advantages of the AIA technique embodiments are described hereafter.

2.0 Learning Phase

Referring again to FIG. 1, this section provides a detailed description of an exemplary embodiment of the aforementioned learning phase 100 of the AIA technique and its associated two stages 106/114.

2.1 Semantic Clustering of Training Images

This section provides a detailed description of exemplary embodiments of the aforementioned semantic clustering stage of the AIA technique. It is important to note that visual similarity between a specific set of images in the Euclidean space does not necessarily mean that the images are semantically similar. Correspondingly, semantic similarity between a specific set of images in the semantic space does not necessarily mean that the images are visually similar in the Euclidean space. This phenomenon can be illustrated by way of the following example. Given a collection of three images, the first image being a telescopic color image of the sun which is filtered to depict the sun as a red-orange colored "fire ball," the second image being a close-up color image of a stand-alone, fully ripe (i.e. red-orange colored) peach, and the third image being a close-up color image of a semi-ripe (i.e. partly green, partly red-orange colored) peach amongst a plurality of semi-ripe peaches, the second and third images are semantically similar but visually dissimilar. Correspondingly, the first and second images are visually similar but semantically dissimilar. If only visual similarity in the Euclidean space were used to compare these three images, the first and second images would be falsely matched, thus introducing the aforementioned "noise" into the keyword annotations for these images and reducing the precision of their annotations.

It is also important to note that images containing different semantics can have different degrees of semantic similarity. This phenomenon can be illustrated by way of the following example. Given a vocabulary of keywords which includes the keywords motorcycle and sky, and a collection of color images of different types of motorcycles, the feature of shape is more informative as a keyword annotation for these motorcycle images than the features of color or texture. On the other hand, given the same vocabulary of keywords and a collection of color images of different types and formations of scattered clouds in the sky, the features of color and texture are more informative as keyword annotations for these cloud/sky images than the feature of shape.

In order to address the aforementioned phenomena, referring again to FIG. 1, rather than learning 100 only a single semantic similarity for the set $\mathcal{T}$ of manually annotated training images in the database 104, the semantic clustering stage 106 first partitions the set of training images into a plurality of semantic clusters of training images 108/112, where each semantic cluster contains training images that are semantically similar, and each training image is partitioned into a single cluster. Given the aforementioned set $\mathcal{A}$ of keyword annotations for the set $\mathcal{T}$ of training images in the database 104, it can be assumed that the semantics of each training image can be represented by the vector $t_i$ of keyword annotations for the image rather than by the vector $x_i$ of its features. This assumption can be made because the vocabulary of keywords resides at a higher level in the semantic space than the features. Given the aforementioned fact that the keyword annotations $t_i$ for each training image in the database 104 include a relatively small number of keywords, the set $\mathcal{T}$ of training images can be partitioned into the plurality of semantic clusters of training images 108/112 using a pair-wise proximity clustering technique which generally compares every possible pair of training images in $\mathcal{T}$ and measures the degree of semantic similarity there-between based upon the semantics indicated by the manually applied keyword annotations $t_i$ for each training image. More particularly, this pair-wise proximity clustering technique computes a pair-wise annotation-based semantic distance score SD( ) between every possible pair of training images in the database 104, where each score SD( ) specifies a metric for the intuitive semantic distance between a particular pair of training images. The AIA technique embodiments described herein employ a two-step clustering method, an exemplary implementation of which will now be described in detail.

Given a first training image $TI_1$ which has been manually annotated with a first vector of keyword annotations given by $a=\{a_1, a_2, \ldots, a_{n_1}\}$, where $n_1$ is the total number of keywords in a, and a second training image $TI_2$ which has been manually annotated with a second vector of keyword annotations given by $b=\{b_1, b_2, \ldots, b_{n_2}\}$, where $n_2$ is the total number of keywords in b, the intuitive semantic distance between $TI_1$ and $TI_2$ can be given by $D(TI_1, TI_2)$. The corresponding pair-wise annotation-based semantic distance score SD( ) which specifies a metric for $D(TI_1, TI_2)$ can be given by SD(a,b), which can be recursively computed by the following equation:

$$SD(a, b) = \frac{1}{2n_1}\sum_{i=1}^{n_1} \min_j SD(a_i, b_j) + \frac{1}{2n_2}\sum_{j=1}^{n_2} \min_i SD(a_i, b_j), \quad (1)$$

where $SD(a_i, b_j)$ is the pair-wise annotation-based semantic distance score which specifies a metric for the semantic distance between the particular pair of keywords $a_i$ and $b_j$. In other words, equation (1) looks for the closest keyword in one vector of keyword annotations with respect to a particular keyword in the other vector of keyword annotations. In tested embodiments of the AIA technique, a conventional Jiang and Conrath (JCN) keyword similarity measure JCN( ) in the conventional WordNet semantic lexicon database was employed for SD( ). However, it is noted that $JCN(a_i, b_j)$ can have a value which ranges from zero to infinity. To address this situation, the following equation can be used to transform $JCN(a_i, b_j)$ into a pair-wise annotation-based semantic distance score $SD(a_i, b_j)$ that has a value which ranges from zero to one:

$$SD(a_i, b_j) = \begin{cases} 1 & \text{for } JCN(a_i, b_j) \leq 0.06 \\ 0.6 - 0.4\sin\left(\frac{25\pi}{2}JCN(a_i, b_j) + \frac{3}{4}\pi\right) & \text{for } 0.06 < JCN(a_i, b_j) < 0.1 \\ 0.6 - 0.6\sin\left[\frac{\pi}{2}\left(1 - \frac{1}{3.471JCN(a_i, b_j) + 0.653}\right)\right] & \text{for } JCN(a_i, b_j) \geq 0.1 \end{cases} \quad (2)$$

It is noted that the value transformation given by equation (2) is motivated by an empirical investigation of the JCN similarity measure distances $JCN(a_i, b_j)$ between various pairs of keywords $a_i$ and $b_j$. More particularly, as is appreciated in the art of the WordNet database, keyword pairs whose JCN similarity measure distance value is less than 0.06 are rarely related (e.g., apple/bath=0.051 and earth/lighthouse=0.059). For such keyword pairs, equation (2) sets SD($a_i,b_j$) to the largest possible value of one. For keyword pairs whose JCN similarity measure distance value equals 0.1, equation (2) sets SD($a_i,b_j$) to 0.6. For keyword pairs with other JCN similarity measure distance values, equation (2) computes SD($a_i,b_j$) by fitting a sin function that considers the continuousness of the pairs.

Thus, given the aforementioned set $\mathcal{A}$ of keyword annotations for the set $\mathcal{T}$ of training images, equations (1) and (2) can be used to compute a pair-wise annotation-based semantic distance score SD( ) between every possible pair of training images in $\mathcal{T}$. This computation results in a set of pair-wise annotation-based semantic distance scores for $\mathcal{T}$, where each score SD( ) specifies a metric for the intuitive semantic distance between a particular pair of training images. This set of scores can then be used to partition the training images in $\mathcal{T}$ into semantic clusters as follows.

It is noted that the intuitive semantic distances between pairs of training images are not a metric measure because the triangle inequality rule does not hold. Thus, the training images cannot be naturally embedded into a vector space in a manner which preserves the absolute values of the intuitive semantic distances between pairs of training images. As such, conventional clustering methods such as a k-means algorithm cannot be used by themselves for the semantic clustering stage. However, since the goal is to simply semantically cluster the pair-wise annotation-based semantic distance scores SD( ), the absolute values of the intuitive semantic distances between pairs of training images do not need to be preserved. Thus, it is not necessary to naturally embed the training images into a vector space in a manner which preserves the absolute values of the intuitive semantic distances between pairs of training images.

As is appreciated in the art of image annotation, any conventional clustering method which is invariant under additive shifts of the intuitive semantic distances between pairs of training images, such as the k-means algorithm, can be reformulated as a grouping task in a Euclidean space. A conventional constant shift embedding framework can thus be employed to embed the training images in $\mathcal{T}$ into a Euclidean vector space, where this framework is able to preserve the cluster structure. A conventional x-means algorithm (which is a variant of the k-means algorithm) can then be employed to group the embedded training images in the Euclidean vector space into H different semantic clusters based upon the set of pair-wise annotation-based semantic distance scores. It is noted that the x-means algorithm automatically determines an optimal value for H. It is also noted that embedding the training images into a Euclidean vector space is advantageous from the perspective of data visualization since many conventional clustering algorithms exist for the Euclidean space.

Referring again to FIG. 1, it is noted that the semantic clustering stage 106 is advantageous since it considers the vector $t_i$ of keyword annotations for each training image 104 as a whole entity rather than considering each keyword individually (i.e. independently from the other keywords in the vector $t_i$), and thus it also considers the semantic coherence that is inherent amongst the keyword annotations. In other words, the semantic clustering stage 106 propagates the vector $t_i$ of keyword annotations for each training image 104 as a coherent semantic entity rather than as individual keywords. By way of example but not limitation, the keywords indoor and sky are unlikely to be applied together as annotations to a typical image. However, if these two keywords are considered individually, both of them could wind up being annotated to the same image. By way of further example, it is better to annotate an image of a tiger with the semantically similar keyword cat, even though this annotation is not an exact match to the visual content of the image, rather than annotating this image with the keyword garden. As a result, the AIA technique embodiments described herein are advantageous since the vector w of keyword annotations 142 that is automatically generated for a new image 122 contains semantically coherent words. The AIA technique embodiments are further advantageous since they allow flexibility in the size of the vocabulary of keywords that is employed.

2.2 Learning SDFs for Semantic Clusters

This section provides a detailed description of an exemplary embodiment of the aforementioned SDF learning stage of the AIA technique. It is important to note that in order to be able to generate precise image annotations one generally must have a good distance function which precisely measures the degree of semantic similarity between images. Generally speaking and referring again to FIG. 1, the SDF learning stage 114 learns an SDF $f^{(i)}$ 116/120 for each semantic cluster of training images 108/112 by employing a mapping procedure which maps the features in the training images in the cluster to feature-based semantic distance scores between pairs of the images (herein referred to as pair-wise feature-based semantic distance scores). A detailed description of an exemplary embodiment of this mapping procedure will now be provided. First, an exemplary embodiment of a general SDF learning algorithm will be described. Then, an exemplary embodiment of an algorithm for learning an SDF for a specific semantic cluster of training images will be described. It is noted that in these descriptions which follow, images are identified by their feature vectors. Thus, a given training image $TI_i$ in $\mathcal{T}$ 104 is identified by its feature vector $x_i$, and the new image not in $\mathcal{T}$ 122 is identified by its feature vector y.

Given the aforementioned set $\mathcal{T}$ of n manually annotated training images and the associated set $\mathcal{A}$ of keyword annotations which have been manually applied to each image in $\mathcal{T}$, as described heretofore, the intuitive semantic distance between a particular pair of training images $x_i$ and $x_j$ can be given by $D(x_i,x_j)$. The general goal of the SDF learning stage is to learn an SDF for $\mathcal{T}$ given by $f^{(\mathcal{T})}$ which is consistent with the ground-truth intuitive semantic distances D( ) between pairs of training images in $\mathcal{T}$. In an exemplary embodiment of the AIA technique, the SDF $f^{(\mathcal{T})}$ can be learned by using a least squares regression given by the following equation:

$$f^{(\mathcal{T})} = \arg\min_{q} \sum_{i=1}^{n} \sum_{j=1}^{n} (D(x_i, x_j) - q(x_i, x_j))^2, \quad (3)$$

where q( ) represents the targeted distance function to learn. However, equation (3) suffers from the fact that it is based on "hard" pair-wise intuitive semantic distance constraints. Given the fact that $\mathcal{T}$ contains a limited amount of training data, and the fact that the features $x_i$ for the images in $\mathcal{T}$ are highly dimensional, using equation (3) to learn the SDF $f^{(\mathcal{T})}$ tends to be over-fitting. One way to address this situation is to "soften" the pair-wise intuitive semantic distance constraints in equation (3) to the following relaxed relative comparison constraints:

$x_j$ is closer to $x_i$ than $x_k$ is to $x_i$, \quad (4)

which results in generating a rank order for the training images in $\mathcal{T}$ rather than attempting to preserve the absolute values of their pair-wise intuitive semantic distances D( ).

It is noted that learning the SDF $f^{(\mathcal{T})}$ via the relaxed relative comparison constraints given by equation (4) allows the AIA technique embodiments described herein to be easily extended to incorporate other data which is labeled by relative comparison relationships such as weakly labeled training data. Furthermore, as is appreciated in the art of image annotation, such relative comparison constraints (e.g., the distance between A and B is smaller than the distance between A and C) are more consistent with a human's perception of semantic similarity than quantitative comparison constraints (e.g., the distance between A and B is 0.05 while the distance between A and C is 0.08).

Given the aforementioned set of manually annotated training images $\mathcal{T}=\{x_1, x_2, \ldots, x_n\}$, a set of relaxed relative comparison constraints S can be given by the equation:

$$S=\{(x_a, x_b, x_c); x_b \text{ is closer to } x_a \text{ than } x_c \text{ is to } x_a\}, \quad (5)$$

where $(x_a, x_b, x_c)$ denotes all the possible triples of training images in $\mathcal{T}$. Given a particular training image in $\mathcal{T}$ which has a feature vector x, and the new image not in $\mathcal{T}$ which has a feature vector y, a metric for the intuitive semantic distance D(x,y) between these two images can be given by the equation:

$$f(x,y) = \sqrt{(x-y)^T A W A^T (x-y)} \quad (6)$$

where W is a diagonal matrix with non-negative entries and A is a prescribed transformation matrix. f(x,y) is equivalent to the weighted Euclidean distance between the linear transformed data points $A^T x$ and $A^T y$. In a special case where $AW A^T$ is equal to an identity matrix, f(x,y) will be equal to the Euclidean distance between the original data points. Matrix A determines how the original data points are transformed. Since a linear transformation is generally limited in terms of the function complexity it can support, the following kernel method can be employed to obtain a nonlinear transformation.

Assuming the existence of a mapping function $\phi( )$ which maps a given feature vector to a very high dimensional vector, the transformation matrix A can be defined by the equation $A=[\phi(x_1), \phi(x_2), \ldots, \phi(x_n)]$, and then a "kernelized" version of f(x,y) can be given by the equation:

$$f(x, y) = \sqrt{\sum_{i=1}^{n} W_{ii}(K(x, x_i) - K(y, x_i))^2}, \quad (7)$$

where kernel K(x,y) can be given by the equation $K(x,y)=\phi(x)\phi(y)$. It is noted that the use of this kernel K( ) suggests a particular choice of A in equation (6), and the parameters to be learned in equation (7) are the diagonal elements of W. f(x,y) as given by equation (7) is hereafter considered to be a pair-wise SDF between a particular training image in $\mathcal{T}$ which has a feature vector x and the new image not in $\mathcal{T}$ which has a feature vector y, where f(x,y) is trained for a training set of images that contains x. A detailed description of an exemplary embodiment of a training technique for f(x,y) will now be provided.

Given the metric f( ) defined by equation (7) for the intuitive semantic distance D( ) between a particular training image in $\mathcal{T}$ and the new image not in $\mathcal{T}$, and given the set S of relaxed relative comparison constraints defined by equation (5), the task of learning an SDF $f^{(\mathcal{P})}$ for a specific semantic cluster $\mathcal{P}$ can be summarized as the following learning algorithm:

$$\text{solve } W_{ii} \quad (8)$$
$$\text{s.t. } \forall\, (x_a, x_b, x_c) \in \mathcal{P}, f(x_a, x_c) - f(x_a, x_b) > 0.$$
$$W_{ii} \geq 0$$

The hard constraints in equation (8) can be transformed into soft constraints by adding slack variables to each of the relaxed relative comparison constraints in a manner similar to a conventional Support Vector Machine (SVM) optimization algorithm. In order to further simplify the computation of equation (8), the constraints on f( ) can be converted to $f^2( )$. As a result, the equation (8) algorithm for learning an SDF $f^{(\mathcal{P})}$ for a specific semantic cluster $\mathcal{P}$ can be converted to the following learning algorithm:

$$\min \sum_l \xi_l \quad (9)$$
$$\text{s.t. } \forall\, (x_a, x_b, x_c) \in \mathcal{P}, f^2(x_a, x_c) - f^2(x_a, x_b) \geq 1 - \xi_l,$$
$$W_{ii} \geq 0$$
$$\xi_l \geq 0$$

where l is an index for the set of relaxed relative comparison constraints for $\mathcal{P}$ and $\xi_l$ represents the slack variables.

If the set S of relaxed relative comparison constraints for $\mathcal{P}$ are feasible and there exists one W which fulfills all the constraints, there will generally be an infinite number of solutions for W since a scalar transformation of a feasible solution W generally results in a feasible solution. To address this situation and make the solution for W unique, an additional constraint can be added to S that the learned SDF $f^{(\mathcal{P})}$ is as close to the un-weighted Euclidean semantic distances as it possibly can be. This additional constraint can be reformulated as minimizing the norm of the eigenvalues of $AW A^T$, which can be equated to the norm $\|AW A^T\|_F^2$. The optimization algorithm denoted in the first row of equation (9) can then be rewritten to include this additional constraint as follows:

$$\min \frac{1}{2}\|AWA^T\|_F^2 + C\sum_l \xi_l, \quad (10)$$

where the ½ is added for the computational convenience of formulating the optimization algorithm as a conventional quadratic programming algorithm, C is a balance parameter which is automatically adjusted, and C>0. It is noted that the bigger C is, the more constraints there are that need to be satisfied. The smaller C is, the closer $f^{(\mathcal{P})}$ is to the un-weighted Euclidean distances. By employing a mathematical derivation, the optimization algorithms in equations (9) and (10) can be further reformulated as the following conventional quadratic programming algorithm:

$$\min \frac{1}{2}\omega^T L\omega + C\sum_l \xi_l \qquad (11)$$

$$\text{s.t. } \forall\, (x_a, x_b, x_c) \in \mathcal{P}, \omega^T(g(x_a, x_c) - g(x_a, x_b)) \geq 1 - \xi_l,$$

$$\omega_i \geq 0$$

$$\xi_l \geq 0$$

where:

$$L = (A^T A) * (A^T A), \qquad (12)$$

$$g(x, y) = (A^T x - A^T y) * (A^T x - A^T y),$$

and where ω is the set of diagonal elements in W, $\omega_i$ is a particular diagonal element in W, and * denotes an element-wise product between vectors. Equations (11) and (12) can then be kernelized by replacing x and y with $\phi(x)$ and $\phi(y)$ respectively, and then re-writing both L and g(x,y) as a function of the aforementioned kernel function K( ). As a result of this kernelization L=M*M and $$A^T x = [K(x_1, x), K(x_2, x), \ldots, K(x_n, x)]^T,$$
$$\text{where } M_{i,j} = K(x_i, x_j).$$

Given the general SDF learning algorithm that has just been described, the following is a detailed description of an embodiment of a procedure for learning an SDF $f^{(k)}$ for a specific k-th semantic cluster of training images based on the aforementioned set S of relaxed relative comparison constraints. The k-th semantic cluster of training images can be given by the equation $\mathcal{T}^{(k)} = \{x_i^{(k)}\}_{i=1}^{n_k}$, where $x_i^{(k)}$ is the i-th image in this cluster and $n_k$ is the number of images in this cluster.

A fundamental task associated with learning the SDF $f^{(k)}$ for $\mathcal{T}^{(k)}$ is to generate a set of relaxed relative comparison constraints from the ground-truth pair-wise intuitive semantic distances for the images in $\mathcal{T}^{(k)}$. An assumption can be made that images containing similar semantics share the same SDF. In other words, the aforementioned metric f(x,y) for D(x,y) is only valid if $x \in \mathcal{T}^{(k)}$. Based on this assumption, the set of relaxed relative comparison constraints for $\mathcal{T}^{(k)}$ can be given by the following equation:

$$\mathcal{R} = \{(x_a, x_b, x_c)\}, \qquad (13)$$

where $x_a \in \mathcal{T}^{(k)}, x_b \in \mathcal{T}^{(k)}, x_c \in \mathcal{T}^{(k)}$, and $(x_a, x_b, x_c)$ is a subset of all the possible triples of training images in $\mathcal{T}^{(k)}$ which satisfies either of the following two conditions:

$$(a)\, D(x_a, x_c) > D(x_a, x_b), \text{ or}$$

$$(b)\, D(x_a, x_c) = D(x_a, x_b) \text{ but } \|x_a - x_c\| > \|x_a - x_b\|. \qquad (14)$$

Condition (a) is straightforward. Condition (b) indicates that if two pairs of training images in a specific semantic cluster have the same intuitive semantic distances there-between, then the difference between the features in $x_a$ and the features in $x_c$ is greater than the difference between the features in $x_a$ and the features in $x_b$.

However, even under the conditions given by equation (14), the number of relaxed relative comparison constraints given by equation (13) can be overwhelmingly large which makes the optimization algorithm denoted in the first row of equation (11) complex to solve. In order to address this situation, a prescribed number m of the relaxed relative comparison constraints can be randomly sampled from $\mathcal{R}$, resulting in a subset of relaxed relative comparison constraints which is given by $\mathcal{R}_i (i=1, \ldots, m)$. Then, m different pair-wise SDFs $\{f_1^{(k)}, \ldots, f_m^{(k)}\}$ can be trained for $\mathcal{T}^{(k)}$, where each different pair-wise SDF $f_i^{(k)}$ is trained using $\mathcal{R}_i$. An overall SDF $f^{(k)}$ for the k-th semantic cluster of training images can then be generated by the following equation:

$$f^{(k)} = \frac{1}{m}\sum_{i=1}^{m} f_i^{(k)}. \qquad (15)$$

In other words, the overall SDF $f^{(k)}$ learned for the k-th cluster can be generated by computing an average of the m different pair-wise SDFs $f_i^{(k)}$ that were trained for the cluster.

3.0 New Image Annotation Phase

Referring again to FIG. 1, this section provides a detailed description of an exemplary embodiment of the aforementioned new image annotation phase 102 of the AIA technique embodiments described herein. It is important to note that the i-th semantic cluster of training images 108/112 has its own SDF $f^{(i)}$ 116/120 which is valid only if it is used to measure the semantic distance between the new image 122 and a training image that is in the i-th semantic cluster. It is also important to note that the different SDFs $f^{(i)}$ 116/120 are learned independently from each other using different objective functions and different constraints. For these reasons, the new image annotation phase 102 employs a two stage 124/132 procedure to automatically annotate the new image 122. A detailed description of exemplary embodiments of these two stages 124/132 will now be provided. It is noted that in this description which follows, images are identified by their feature vectors. Thus, a given training image $TI_i$ in $\mathcal{T}$ 104 is identified by its feature vector $x_i$.

3.1 Generating Ranking Lists & Association Probabilities for Semantic Clusters This section provides a detailed description of an exemplary embodiment of the aforementioned image ranking stage of the AIA technique. Generally speaking, as described heretofore and referring again to FIG. 1, the image ranking stage 124 operates as follows for each semantic cluster of training images 108/112. Given a k-th semantic cluster of training images 108/112, the SDF $f^{(k)}$ 116/120 which was learned for the cluster can be used to compute a pair-wise feature-based semantic distance score between the new image 122 and each training image in the cluster, resulting in a set of pair-wise feature-based semantic distance scores for the cluster. As described heretofore, each feature-based score in this set of scores specifies a metric for the intuitive semantic distance D( ) between the new image 122 and a particular training image in the cluster 108/112. This set of scores can then be used to generate a ranking list 126/130 which ranks each training image in the cluster 108/112 according to its intuitive semantic distance from the new image 122. A probability density function (PDF) can be generated which estimates the visual features in the images in the cluster 108/112. The PDF can then be used to estimate a cluster association probability p(k) 110/118 for the cluster 108/112 which specifies the probability of the new image being semantically associated with the cluster. In an exemplary embodiment a conventional kernel probability density estimation method can be used to generate the PDF.

3.2 Propagating Keyword Annotations to New Image

This section provides a detailed description of an exemplary embodiment of the aforementioned annotation propagation stage of the AIA technique. Referring again to FIG. 1, the annotation propagation stage 132 operates as follows for each semantic cluster of training images 108/112. Given a k-th semantic cluster of training images 108/112, the aforementioned vectors $t_i$ of keyword annotations which have been manually applied to each training image, and the aforementioned ranking list 126/130 for the k-th cluster, a set of ranked keyword annotations for the k-th cluster $\mathcal{A}^{(k)}$ can be given by the equation $\mathcal{A}^{(k)} = \{t_1^{(k)}, t_2^{(k)}, \ldots, t_{n_k}^{(k)}\}$, where $n_k$ is the total number of training images in the k-th cluster, and $t_i^{(k)}$ is the vector of keyword annotations which has been manually applied to the i-th training image in the ranking list. Assuming $d_i^{(k)}$ represents the pair-wise feature-based semantic distance score between the new image 122 and the i-th training image in the ranking list 126/130, a set of ranked pair-wise semantic distance scores for the k-th cluster 108/112 can be given by $\{d_1^{(k)}, d_2^{(k)}, \ldots, d_{n_k}^{(k)}\}$. The vector $t_i^{(k)}$ of keyword annotations for the first training image in the ranking list 126/130 for the k-th cluster 108/112 can be propagated to the new image 122 with a weight of 1.0, and the vector $t_5^{(k)}$ of keyword annotations for the fifth training image in the ranking list for the k-th cluster can be propagated to the new image with a weight of 0.5. As such, the vector $w^{(k)}$ of probabilistic keyword annotations 134/138 which is propagated to the new image 122 from the k-th semantic cluster of training images 108/112 can be given by the following equation:

$$w^{(k)} = \frac{1}{n_k} \sum_i \frac{d_1^{(k)} - \alpha^{(k)}}{d_i^{(k)} - \alpha^{(k)}} * t_i^{(k)}, \quad (16)$$

where $\alpha^{(k)}$ is a prescribed coefficient which is set such that $$\frac{d_1^{(k)} - \alpha^{(k)}}{d_5^{(k)} - \alpha^{(k)}} = 0.5.$$

$w^{(k)}$ can then be normalized. In tested embodiments $w^{(k)}$ was normalized such that the L−1 norm of $w^{(k)}$ is one.

Referring again to FIG. 1, once a normalized vector $w^{(i)}$ of probabilistic keyword annotations 134/138 for the new image 122 has been generated for each semantic cluster of training images 108/112, each of these vectors $w^{(i)}$ can then be linearly combined 140 in a weighted fusion manner to produce a vector w of final keyword annotations for the new image 142 by employing the following equation:

$$w = \sum_{i=1}^{H} p(i) * w^{(i)}, \quad (17)$$

where p(i) is the aforementioned cluster association probability 110/118 which was estimated for each cluster in the image ranking stage 124. It is noted that w contains a weighted collection of all the possible keyword annotations for the new image. Depending on the number and the nature of the training images in $\mathcal{T}$ and their associated keyword annotations in $\mathcal{A}$, w can contain a large number of weighted keyword annotations. From a practical standpoint, a smaller set of final annotations for the new image can be generated in various ways. By way of example but not limitation, in one embodiment of the AIA technique the smaller set can be generated by selecting a prescribed number of keyword annotations in w with the largest weights. In another embodiment the smaller set can be generated by selecting the keyword annotations in w whose weights exceed a prescribed threshold.

4.0 AIA Process

Figure 2A:
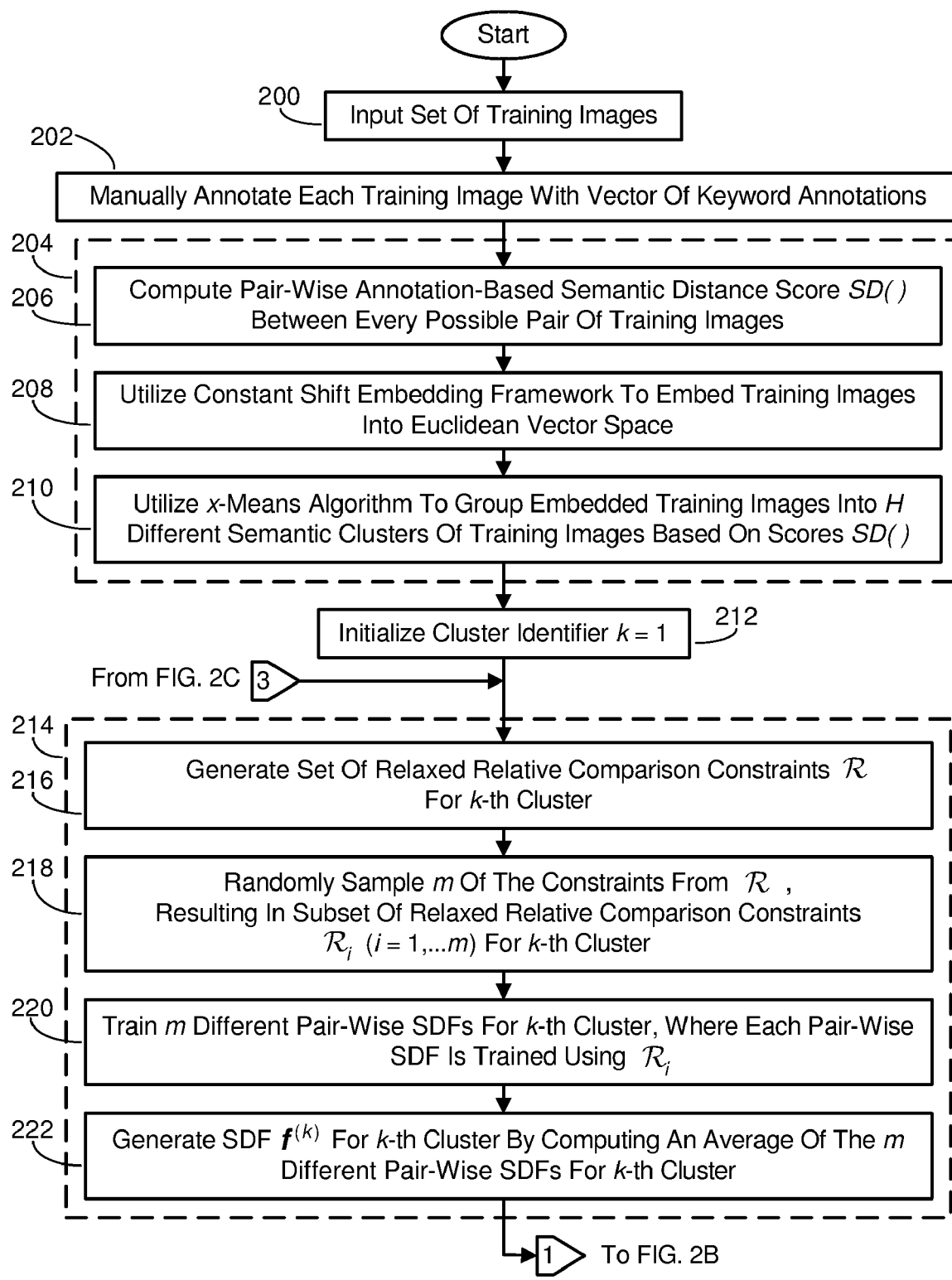
FIGS. 2A-2C illustrate an exemplary embodiment, in simplified form, of a process for automatically annotating a new image.
Figure 2B:
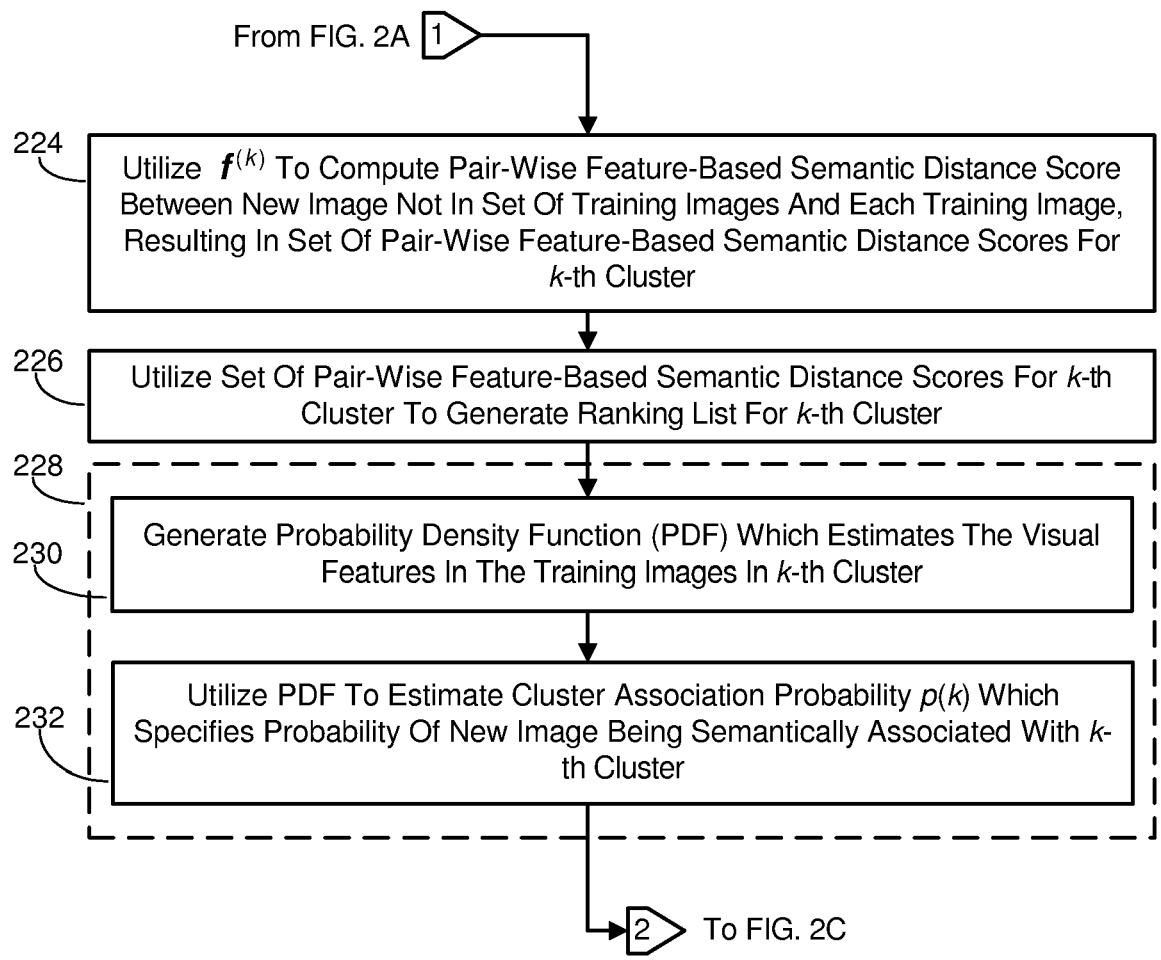
Figure 2C:
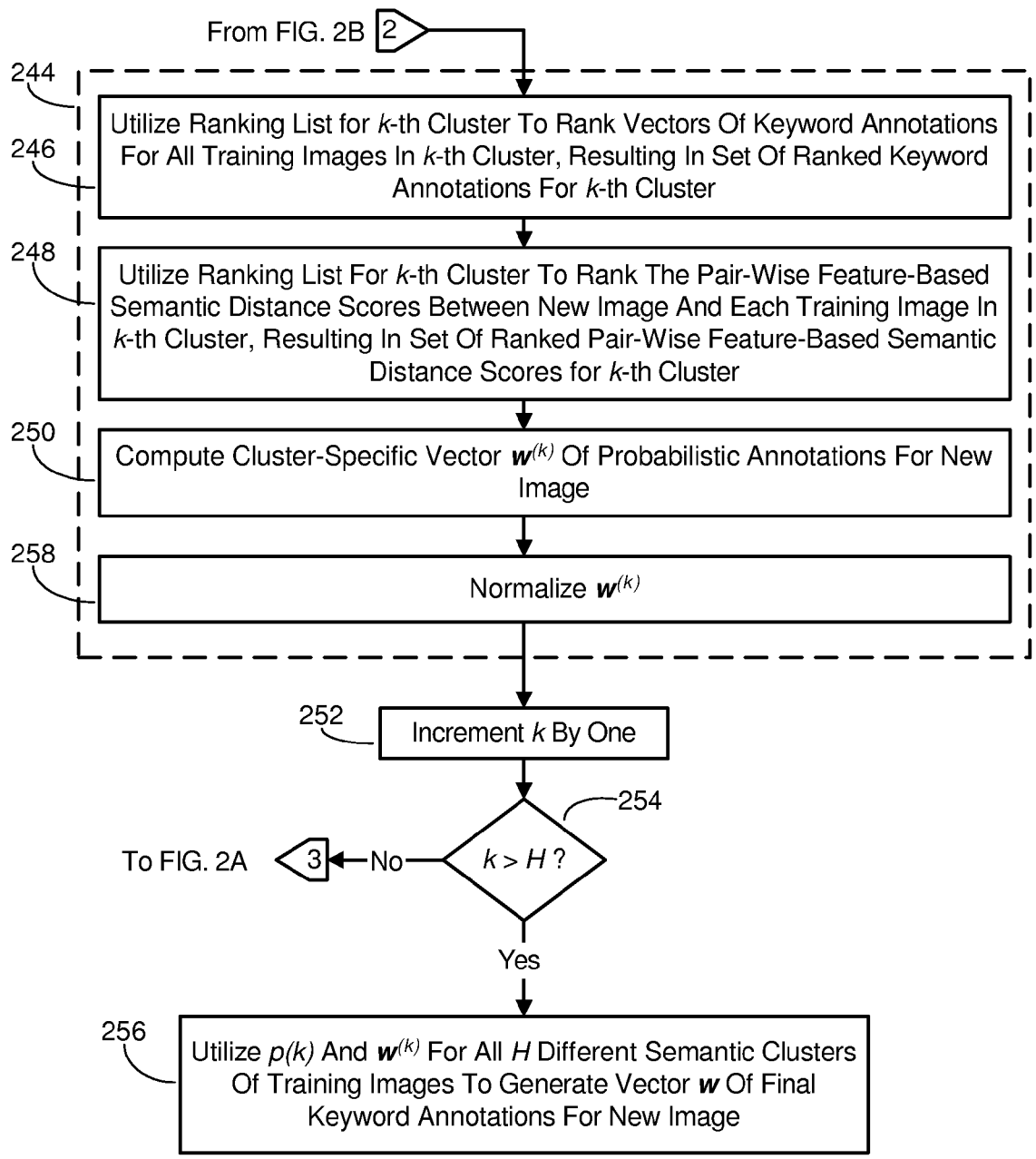

FIGS. 2A-2C illustrate an exemplary embodiment, in simplified form, of a process for automatically annotating a new image given the foregoing description. As depicted in FIG. 2A, the process starts with inputting a set $\mathcal{T}$ of training images 200, where the new image is not in $\mathcal{T}$. Each training image in $\mathcal{T}$ is then manually annotated with a vector of keyword annotations 202. $\mathcal{T}$ is then partitioned into a plurality of semantic clusters $\mathcal{T}^{(k)}$ of training images 204 by first computing a pair-wise annotation-based semantic distance score SD( ) between every possible pair of training images in $\mathcal{T}$ 206, then utilizing a constant shift embedding framework to embed the training images in $\mathcal{T}$ into a Euclidean vector space 208, and then utilizing an x-means algorithm to group the embedded training images into H different semantic clusters $\mathcal{T}^{(k)}$ of training images based upon the scores SD( ) 210. A cluster identifier k is then initialized to one 212. A semantic distance function (SDF) $f^{(1)}$ is then learned for the first cluster $\mathcal{T}^{(k)}$ of training images 214 by first generating a set of relaxed relative comparison constraints $\mathcal{R}$ for $\mathcal{T}^{(k)}$ 216, then randomly sampling a prescribed number m of the constraints from $\mathcal{R}$ resulting in a subset of relaxed relative comparison constraints $\mathcal{R}_i$ (i=1, \ldots, m) for $\mathcal{T}^{(k)}$ 218, then training m different pair-wise SDFs $\{f_1^{(1)}, \ldots, f_m^{(1)}\}$ for $\mathcal{T}^{(k)}$ 220, where each pair-wise SDF $f_i^{(1)}$ is trained using $\mathcal{R}_i$, and then generating the SDF $f^{(1)}$ for $\mathcal{T}^{(k)}$ by computing an average of $\{f_1^{(1)}, \ldots, f_m^{(1)}\}$ 222.

Referring again to FIGS. 2A and 2B, once process action 222 has been completed, $f^{(1)}$ is then utilized to compute a pair-wise feature-based semantic distance score between the new image and each training image in $\mathcal{T}^{(1)}$, resulting in a set of pair-wise feature-based semantic distance scores for $\mathcal{T}^{(k)}$ 224. The set of pair-wise feature-based semantic distance scores for $\mathcal{T}^{(k)}$ is then utilized to generate a ranking list for $\mathcal{T}^{(k)}$ 226, where this list ranks each training image in $\mathcal{T}^{(k)}$ according to its intuitive semantic distance from the new image. Once process action 226 has been completed, a cluster association probability p(1) for $\mathcal{T}^{(k)}$ is then estimated 228 as follows. A probability density function (PDF) is first generated which estimates the visual features in the training images in $\mathcal{T}^{(k)}$ 230. The PDF is then utilized to estimate the cluster association probability p(1) which specifies a probability of the new image being semantically associated with $\mathcal{T}^{(k)}$ 232.

Referring again to FIGS. 2B and 2C, once process action 232 has been completed, the vector of keyword annotations for each training image in $\mathcal{T}^{(k)}$ is probabilistically propagated to the new image 244 as follows. The ranking list for $\mathcal{T}^{(k)}$ is first utilized to rank the vectors of keyword annotations for all the training images in $\mathcal{T}^{(1)}$, resulting in a set of ranked keyword annotations for $\mathcal{T}^{(k)}$ 246 as described heretofore. The ranking list for $\mathcal{T}^{(k)}$ is then utilized to rank the pair-wise feature-based semantic distance scores between the new image and each training image in $\mathcal{T}^{(1)}$, resulting in a set of ranked pair-wise feature-based semantic distance scores for $\mathcal{T}^{(k)}$ 248 as described heretofore. A cluster-specific vector $w^{(1)}$ of probabilistic annotations for the new image is then computed 250, and $w^{(1)}$ is normalized 258 as described heretofore.

Referring again to FIGS. 2A-2C, once process action 258 has been completed, the cluster identifier k is incremented by one 252. If k is not greater than H 254, process actions 216, 218, 220, 222, 224, 226, 230, 232, 246, 248, 250, 258 and 252 are repeated for the next semantic cluster $\mathcal{T}^{(k)}$ of training images. If k is greater than H 254, the cluster association probabilities p(k) and cluster-specific vectors $w^{(k)}$ of probabilistic annotations for all the semantic clusters $\mathcal{T}^{(k)}$ of training images are finally utilized to generate a vector w of final keyword annotations for the new image 256 as described heretofore.

5.0 Relative Comparative Score (RCS) Performance Measurement Technique

This section provides a detailed description of an exemplary embodiment of the semantic relative comparative score (RCS) technique for measuring and comparing the annotation precision of two different AIA algorithms by taking into account the semantic relevance between the keyword annotations which are automatically generated by the algorithms for a common image. Generally speaking, the semantic RCS technique embodiment described herein is based on the precept that if an automatically generated keyword annotation for an image does not have an exact match to a ground-truth annotation for the image, the automatically generated keyword annotation is expected to represent the semantics of the image as closely as possible. By way of example but not limitation, generating the keyword annotation water for an image of a waterfall is more precise than generating the keyword annotation clouds for this image if clouds are not present in the image.

Given an image which has been automatically annotated with a particular keyword w, even if w does not exactly match any of the keyword annotations which have been manually applied to the image (i.e. the ground-truth annotations for the image), in some cases w can still be an acceptable (i.e. precise) annotation for the image. In fact, in some cases w can actually be a more precise annotation for the image than one which exactly matches a particular ground-truth annotation for the image. An example of this situation can be found in FIG. 5 which illustrates a table comparing keyword annotations that were applied to a common image by three different image annotation algorithms.

Referring again to FIG. 5, in the first row 500 of the table the keyword annotations were manually applied to the image. In the second row 502 of the table the keyword annotations were automatically generated for the image by an AIA algorithm 1. In the third row 504 of the table the keyword annotations were automatically generated for the image by a different AIA algorithm 2. Assuming, as described heretofore, that the manually applied annotations are considered to be the ground-truth annotations for the image, it is noted that the annotations generated by AIA algorithm 1 contain one keyword annotation (mountain) which exactly matches the ground-truth annotations, whereas the annotations generated by AIA algorithm 2 contain no keyword annotations which exactly match the ground-truth annotations. However, the annotations generated by AIA algorithm 2 are actually more precise than those generated by AIA algorithm 1 since three of the keywords generated by algorithm 2 (tree, water and sun) are semantically similar to three of the ground-truth annotations (e.g., tree/trunk, water/waterfall and sun/sunrise). A detailed description of an exemplary embodiment of the semantic RCS technique will now be provided.

A set T of images can be given by the equation T={$x_1$, $x_2$, . . . , $x_n$}, where $x_i$ is a feature vector that describes the low-level visual features in the i-th image (hereafter denoted as T) and n is the total number of images in T. A set $T^G$ of ground-truth keyword annotations which have been manually applied to T can be given by the equation $T^G${$t_1^G, t_2^G, \ldots, t_n^G$}, where $t_i^G$ is a vector of ground-truth keyword annotations which have been manually applied to $T_i$. Similarly, sets $T^{A1}$ and $T^{A2}$ of keyword annotations which have been automatically generated for T by AIA algorithms 1 and 2 respectively can be given by the equations $T^{A1}=\{t_1^{A1}, t_2^{A1}, \ldots, t_n^{A1}\}$ and $T^{A2}=\{t_1^{A2}, t_2^{A2}, \ldots, t_n^{A2}\}$ respectively, where $t_i^{A1}$ is a vector of keyword annotations which have been automatically generated for $T_i$ by AIA algorithm 1, and $t_i^{A2}$ is a vector of keyword annotations which have been automatically generated for $T_i$ by AIA algorithm 2.

A semantic RCS which measures and compares the annotation precision of AIA algorithms 1 and 2 can be given by the following equation:

$$RCS = \frac{\text{number of images in } T \text{ for which } SD(t_i^G, t_i^{A1}) < SD(t_i^G, t_i^{A2})}{n}, \quad (18)$$

where SD(•,•) is the pair-wise annotation-based semantic distance given by equations (1) and (2). If RCS>0.5 then the keyword annotations generated for T by AIA algorithm 1 are semantically more precise than those generated by AIA algorithm 2 (i.e., the annotation precision of algorithm 1 is greater than that of algorithm 2). If RCS<0.5 then the keyword annotations generated for T by AIA algorithm 2 are semantically more precise than those generated by AIA algorithm 1 (i.e., the annotation precision of algorithm 2 is greater than that of algorithm 1). If RCS=0.5 then the annotation precision of algorithms 1 and 2 can be considered to be the same. The semantic RCS technique embodiment described herein is advantageous since rather than considering a keyword annotation for a given image as being "correct" only when there is an exact match to a visual concept in the image, the semantic RCS technique embodiment also considers the semantic relevance of the annotation to the ground-truth annotation for the image.

5.1 RCS Process

Figures 3, 5:
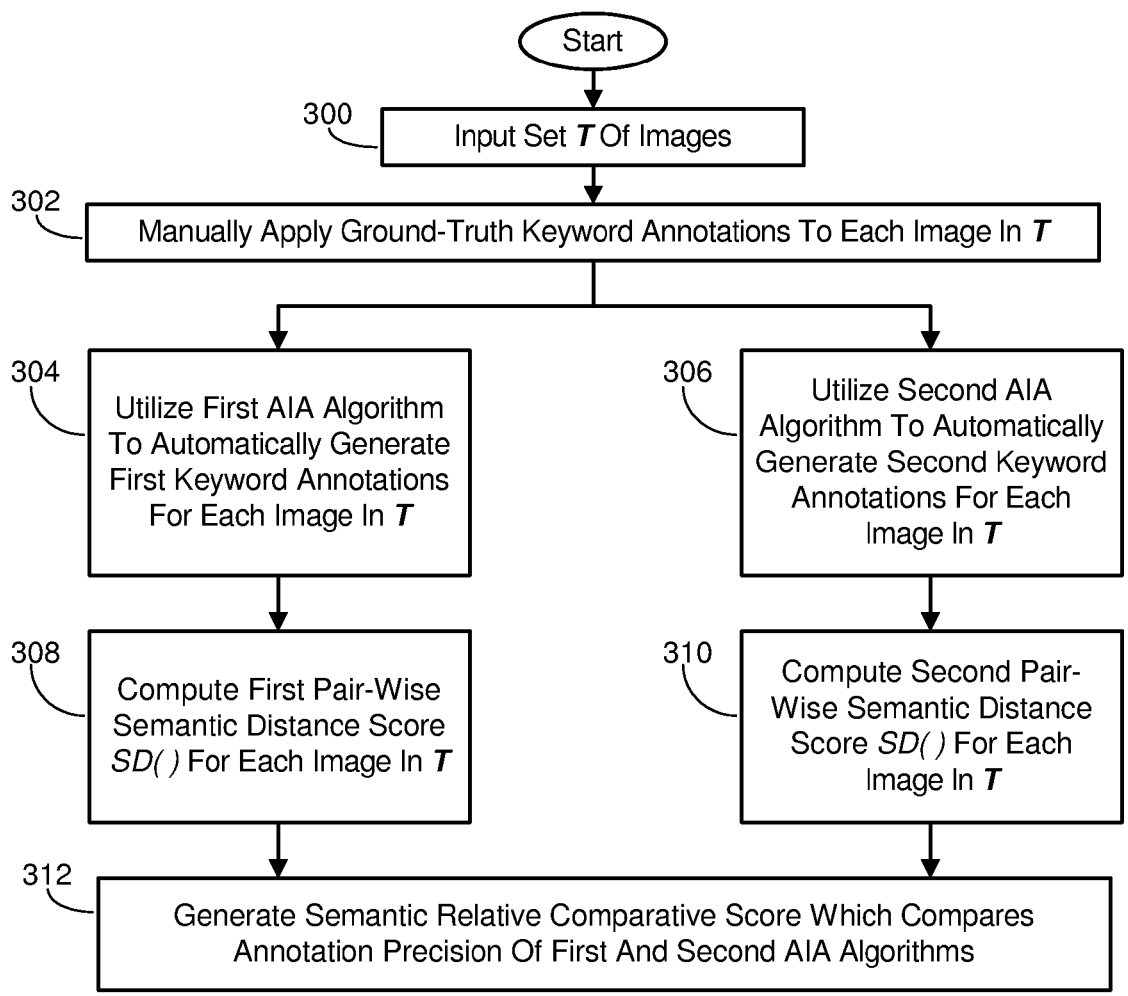
FIG. 3 illustrates an exemplary embodiment, in simplified form, of a process for comparing the annotation precision of two different AIA algorithms.
FIG. 5 illustrates a table comparing keyword annotations that were applied to a common image by three different image annotation algorithms.

FIG. 3 illustrates an exemplary embodiment, in simplified form, of a process for comparing the annotation precision of two different AIA algorithms. As depicted in FIG. 3, the process starts with inputting a set T of images 300. Ground-truth keyword annotations are then manually applied to each image in T 302. A first AIA algorithm is then utilized to automatically generate first keyword annotations for each image in T 304, and a second AIA algorithm is utilized to automatically generate second keyword annotations for each image in T 306. A first pair-wise semantic distance score SD( ) is then computed for each image in T, where this first score SD( ) specifies a metric for a semantic distance between the first keyword annotations and the ground-truth keyword annotations 308, and a second pair-wise semantic distance score SD( ) is computed for each image in T, where this second score SD( ) specifies a metric for a semantic distance between the second keyword annotations and the ground-truth keyword annotations 310. A semantic relative comparative score is then generated which compares the annotation precision of the first and second AIA algorithms by first determining a number of images in T for which the first score SD( ) is less than the second score SD( ), and then dividing this number of images by the total number of images in T 312.

6.0 Computing Environment

This section provides a brief, general description of a suitable computing system environment in which portions of the AIA technique and semantic RCS technique embodiments described herein can be implemented. These AIA technique and semantic RCS technique embodiments are operational with numerous general purpose or special purpose computing system environments or configurations. Exemplary well known computing systems, environments, and/or configurations that can be suitable include, but are not limited to, personal computers (PCs), server computers, hand-held or laptop devices, multiprocessor systems, microprocessor-based systems, set top boxes, programmable consumer electronics, network PCs, minicomputers, mainframe computers, distributed computing environments that include any of the aforementioned systems or devices, and the like.

Figure 4:
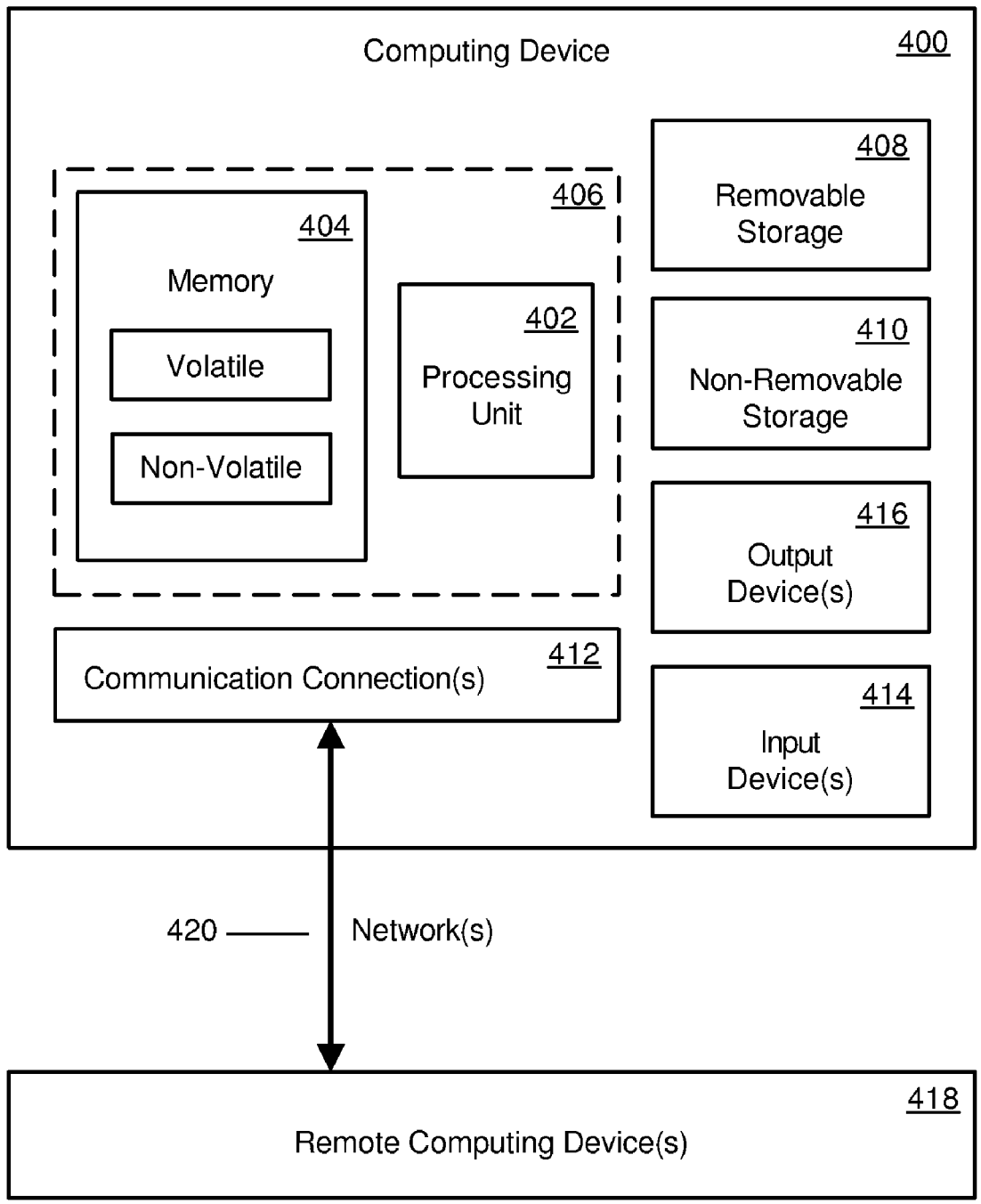
FIG. 4 illustrates a diagram of an exemplary embodiment, in simplified form, of a general purpose, network-based computing device which constitutes an exemplary system for implementing the AIA technique embodiments described herein.

FIG. 4 illustrates a diagram of an exemplary embodiment, in simplified form, of a suitable computing system environment according to the AIA technique and semantic RCS technique embodiments described herein. The environment illustrated in FIG. 4 is only one example of a suitable computing system environment and is not intended to suggest any limitation as to the scope of use or functionality of the AIA technique and semantic RCS technique embodiments described herein. Neither should the computing system environment be interpreted as having any dependency or requirement relating to any one or combination of components exemplified in FIG. 4.

As illustrated in FIG. 4, an exemplary system for implementing the AIA technique and semantic RCS technique embodiments described herein includes one or more computing devices, such as computing device 400. In its simplest configuration, computing device 400 typically includes at least one processing unit 402 and memory 404. Depending on the specific configuration and type of computing device, the memory 404 can be volatile (such as RAM), non-volatile (such as ROM and flash memory, among others) or some combination of the two. This simplest configuration is illustrated by dashed line 406.

As exemplified in FIG. 4, computing device 400 can also have additional features and functionality. By way of example, computing device 400 can include additional storage such as removable storage 408 and/or non-removable storage 410. This additional storage includes, but is not limited to, magnetic disks, optical disks and tape. Computer storage media typically embodies volatile and non-volatile media, as well as removable and non-removable media implemented in any method or technology. The computer storage media provides for storage of various information required to operate the device 400 such as computer readable instructions associated with an operating system, application programs and other program modules, and data structures, among other things. Memory 404, removable storage 408 and non-removable storage 410 are all examples of computer storage media. Computer storage media includes, but is not limited to, RAM, ROM, EEPROM, flash memory or other memory technology, CD-ROM, digital versatile disks (DVD) or other optical disk storage technology, magnetic cassettes, magnetic tape, magnetic disk storage or other magnetic storage devices, or any other medium which can be used to store the desired information and which can be accessed by computing device 400. Any such computer storage media can be part of computing device 400.

As exemplified in FIG. 4, computing device 400 also includes a communications connection(s) 412 that allows the device to operate in a networked environment and communicate with a remote computing device(s), such as remote computing device(s) 418. Remote computing device(s) 418 can be a PC, a server, a router, a peer device, or other common network node, and typically includes many or all of the elements described herein relative to computing device 400. Communication between computing devices takes place over a network(s) 420, which provides a logical connection(s) between the computing devices. The logical connection(s) can include one or more different types of networks including, but not limited to, a local area network(s) (LAN) and wide area network(s) (WAN). Such networking environments are commonplace in conventional offices, enterprise-wide computer networks, intranets and the Internet. It will be appreciated that the communications connection(s) 412 and related network(s) 420 described herein are exemplary and other means of establishing communication between the computing devices can be used.

As exemplified in FIG. 4, communications connection(s) 412 and related network(s) 420 are an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, but not limitation, communication media includes wired media such as a wired network or direct-wired connection, and wireless media such as acoustic, radio frequency (RF), infrared, frequency modulation (FM) radio and other wireless media. The term "computer-readable medium" as used herein includes both the aforementioned storage media and communication media.

As exemplified in FIG. 4, computing device 400 also includes an input device(s) 414 and output device(s) 416. Exemplary input devices 414 include, but are not limited to, a keyboard, mouse, pen, touch input device, microphone, and camera, among others. A user can enter commands and various types of information into the computing device 400 through the input device(s) 414. Exemplary output devices 416 include, but are not limited to, a display device(s), a printer, and audio output devices, among others. These input and output devices are well known and need not be described at length here.

Referring again to FIG. 4, the AIA technique and semantic RCS technique embodiments described herein can be further described in the general context of computer-executable instructions, such as program modules, which are executed by computing device 400. Generally, program modules include routines, programs, objects, components, and data structures, among other things, that perform particular tasks or implement particular abstract data types. The AIA technique and semantic RCS technique embodiments can also be practiced in a distributed computing environment where tasks are performed by one or more remote computing devices 418 that are linked through a communications network 412/420. In a distributed computing environment, program modules can be located in both local and remote computer storage media including, but not limited to, memory 404 and storage devices 408/410.

7.0 Additional Embodiments

While the AIA technique and semantic RCS technique have been described in detail by specific reference to embodiments thereof, it is understood that variations and modifications thereof can be made without departing from the true spirit and scope of the AIA technique and semantic RCS technique. By way of example but not limitation, in addition to the x-means algorithm described heretofore which is employed to group the embedded training images in the Euclidean vector space into the H different semantic clusters, other suitable clustering algorithms such as a conventional spectral clustering algorithm or a conventional Gaussian mixture model algorithm can alternately be employed to perform this semantic clustering. It is also noted that any or all of the aforementioned embodiments can be used in any combination desired to form additional hybrid embodiments. Although the AIA technique and semantic RCS technique embodiments have been described in language specific to structural features and/or methodological acts, it is to be understood that the subject matter defined in the appended claims is not necessarily limited to the specific features or acts described heretofore. Rather, the specific features and acts described heretofore are disclosed as example forms of implementing the claims.

Wherefore, what is claimed is:

1. A computer-implemented process for automatically annotating a new image, comprising using a computing device to perform the following process actions:

inputting a set $\mathcal{T}$ of training images, wherein the new image is not in $\mathcal{T}$;

manually annotating each training image in $\mathcal{T}$ with a vector of keyword annotations;

partitioning $\mathcal{T}$ into a plurality of semantic clusters $\mathcal{T}^{(k)}$ of training images, wherein k is a variable which uniquely identifies each cluster, $\mathcal{T}^{(k)}$ comprises training images that are semantically similar, and each training image is partitioned into a single cluster;

for each semantic cluster $\mathcal{T}^{(k)}$ of training images, learning a semantic distance function (SDF) $f^{(k)}$ for $\mathcal{T}^{(k)}$, utilizing $f^{(k)}$ to compute a pair-wise feature-based semantic distance score between the new image and each training image in $\mathcal{T}^{(k)}$, resulting in a set of pair-wise feature-based semantic distance scores for $\mathcal{T}^{(k)}$, wherein each feature-based score in the set specifies a metric for an intuitive semantic distance between the new image and a particular training image in $\mathcal{T}^{(k)}$, utilizing the set of pair-wise feature-based semantic distance scores for $\mathcal{T}^{(k)}$ to generate a ranking list for $\mathcal{T}^{(k)}$, wherein said list ranks each training image in $\mathcal{T}^{(k)}$ according to its intuitive semantic distance from the new image, estimating a cluster association probability p(k) for $\mathcal{T}^{(k)}$, wherein p(k) specifies a probability of the new image being semantically associated with $\mathcal{T}^{(k)}$, and probabilistically propagating the vector of keyword annotations for each training image in $\mathcal{T}^{(k)}$ to the new image, resulting in a cluster-specific vector $w^{(k)}$ of probabilistic annotations for the new image; and utilizing p(k) and $w^{(k)}$ for all the semantic clusters $\mathcal{T}^{(k)}$ of training images to generate a vector w of final keyword annotations for the new image.

2. The process of claim 1, wherein, the vector of keyword annotations for each training image serves as a metadata tag for the image, said vector comprising one or more textual keywords, wherein, the keywords are drawn from a prescribed vocabulary of keywords, and each keyword describes a different low-level visual feature in the image.

3. The process of claim 2, wherein the prescribed vocabulary of keywords comprises a Corel keyword database.

4. The process of claim 2, wherein the vector of keyword annotations for each training image comprises between one and five different keywords.

5. The process of claim 1, wherein the semantics of each training image are assumed to be represented by the vector of keyword annotations for said image, and the process action of partitioning $\mathcal{T}$ into a plurality of semantic clusters $\mathcal{T}^{(k)}$ of training images comprises actions of:

computing a pair-wise annotation-based semantic distance score SD( ) between every possible pair of training images in $\mathcal{T}$, wherein each score SD( ) specifies a metric for the intuitive semantic distance between a particular pair of training images in $\mathcal{T}$; and utilizing said scores SD( ) to partition the training images in $\mathcal{T}^{(k)}$ into H different semantic clusters $\mathcal{T}^{(k)}$ of training images.

6. The process of claim 5, wherein the pair-wise annotation-based semantic distance score SD( ) for a particular pair of training images in $\mathcal{T}$ is given by the equation $$SD(a, b) = \frac{1}{2n_1}\sum_{i=1}^{n_1}\min_{j} SD(a_i, b_j) + \frac{1}{2n_2}\sum_{j=1}^{n_2}\min_{i} SD(a_i, b_j),$$

wherein, a is the vector of keyword annotations for one image in the pair, $n_1$ is a total number of keywords in a, and $a_i$ is a particular keyword in a, and b is the vector of keyword annotations for the other image in the pair, $n_2$ is a total number of keywords in b, and $b_j$ is a particular keyword in b.

7. The process of claim 6, wherein, a Jiang and Conrath (JCN) keyword similarity measure JCN( ) is employed to compute $SD(a_i, b_j)$, and $SD(a_i, b_j)$ is given by the equation $$SD(a_i, b_j) = \begin{cases} 1 & \text{for } JCN(a_i, b_j) \leq 0.06 \\ 0.6 - 0.4\sin\left(\frac{25\pi}{2} JCN(a_i, b_j) + \frac{3}{4}\pi\right) & \text{for } 0.06 < JCN(a_i, b_j) < 0.1 \\ 0.6 - 0.6\sin\left[\frac{\pi}{2}\left(1 - \frac{1}{3.471 JCN(a_i, b_j) + 0.653}\right)\right] & \text{for } JCN(a_i, b_j) \geq 0.1 \end{cases}$$

8. The process of claim 5, wherein the process action of utilizing said scores SD( ) to partition the training images in $\mathcal{T}$ into H different semantic clusters $\mathcal{T}^{(k)}$ of training images comprises actions of:
- utilizing a constant shift embedding framework to embed the training images in $\mathcal{T}$ into a Euclidean vector space; and
- utilizing an x-means algorithm to group the embedded training images into the H different semantic clusters $\mathcal{T}^{(k)}$ of training images based upon said scores SD( ), wherein the x-means algorithm automatically determines an optimal value for H.

9. The process of claim 1, wherein $\mathcal{T}$ is given by the equation $\mathcal{T}=\{x_1, x_2, \ldots, x_n\}$, n is a total number of training images in $\mathcal{T}$, $x_i$ is a feature vector for the i-th training image comprising the low-level visual features contained within said image, $\mathcal{T}^{(k)}$ is given by the equation $\mathcal{T}^{(k)}=\{x_i^{(k)}\}_{i=1}^{n_k}=\mathcal{P}$, wherein $n_k$ is a number of training images in $\mathcal{P}$, and the process action of learning a semantic distance function (SDF) $f^{(k)}$ for $\mathcal{T}^{(k)}$ comprises actions of:
- generating a set of relaxed relative comparison constraints $\mathcal{R}$ for $\mathcal{T}^{(k)}$, wherein $\mathcal{R}$ is given by the equation $\mathcal{R}=\{(x_a,x_b,x_c)\}$ and $(x_a,x_b,x_c)$ is a subset of all the possible triples of training images in $\mathcal{T}^{(k)}$ which satisfies either,
  - a first condition in which the intuitive semantic distance between $x_a$ and $x_c$ is greater than said distance between $x_a$ and $x_b$, or
  - a second condition in which the intuitive semantic distance between $x_a$ and $x_c$ equals said distance between $x_a$ and $x_b$ but the difference between the features in $x_a$ and the features in $x_c$ is greater than the difference between the features in $x_a$ and the features in $x_b$;
- randomly sampling a prescribed number m of the constraints from $\mathcal{R}$ resulting in a subset of relaxed relative comparison constraints for $\mathcal{T}^{(k)}$ given by $\mathcal{R}_i$ (i=1, ..., m);
- training m different pair-wise SDFs $\{f_1^{(k)}, \ldots, f_m^{(k)}\}$ for $\mathcal{T}^{(k)}$, wherein each pair-wise SDF $f_i^{(k)}$ is trained using $\mathcal{R}_i$; and
- generating $f^{(k)}$ by computing an average of the m different pair-wise SDFs $\{f_1^{(k)}, \ldots, f_m^{(k)}\}$.

10. The process of claim 9, wherein each pair-wise SDF $f_i^{(k)}$ is given by the equation $$f(x, y) = \sqrt{\sum_{i=1}^{n} W_{ii}(K(x, x_i) - K(y, x_i))^2},$$

wherein,
- x is a feature vector for a training image under consideration,
- y is a feature vector for the new image,
- W is a diagonal matrix with non-negative entries, and
- K( ) is a kernel given by the equation $K(x,y)=\phi(x)\phi(y)$, wherein $\phi( )$ is a mapping function which maps a given feature vector to a very high dimensional vector.

11. The process of claim 10, wherein the diagonal matrix W is computed using the quadratic programming algorithm $$\min \quad \frac{1}{2}\omega^T L\omega + C\Sigma_\ell \xi_\ell$$

s.t. $\forall (x_a, x_b, x_c) \in \mathcal{P}, \omega^T(g(x_a, x_c) - g(x_a, x_b)) \geq 1 - \xi_\ell$, wherein, $$\omega_i \geq 0$$

$$\xi_\ell \geq 0$$

L is given by the equation $L=(A^TA)*(A^TA)$,
g( ) is given by the equation $g(x,y)=(A^Tx-A^Ty)*(A^Tx-A^Ty)$,
$\omega$ is a set of diagonal elements in W,
$\omega_i$ is a particular diagonal element in W,
C is a balance parameter which is automatically adjusted and which is greater than zero,
l is an index for the set of relaxed relative comparison constraints $\mathcal{R}$ for $\mathcal{T}^{(k)}$,
$\xi_l$ are slack variables,
* denotes an element-wise product between vectors, and
A is a prescribed transformation matrix.

12. The process of claim 10, wherein the process action of estimating a cluster association probability p(k) for $\mathcal{T}^{(k)}$ comprises actions of:
- generating a probability density function (PDF) which estimates the visual features in the training images in $\mathcal{T}^{(k)}$; and
- utilizing the PDF to estimate the cluster association probability p(k).

13. The process of claim 1, wherein the process action of probabilistically propagating the vector of keyword annotations for each training image in $\mathcal{T}^{(k)}$ to the new image comprises actions of:
- utilizing the ranking list for $\mathcal{T}^{(k)}$ to rank the vectors of keyword annotations for all the training images in $\mathcal{R}$ resulting in a set of ranked keyword annotations for $\mathcal{T}^{(k)}$ given by $\{t_1^{(k)}, t_2^{(k)}, \ldots, t_{n_k}^{(k)}\}$, wherein $n_k$ is a total number of training images in $\mathcal{T}^{(k)}$, and $t_i^{(k)}$ is the vector of keyword annotations for the i-th training image in the ranking list;
- utilizing the ranking list for $\mathcal{T}^{(k)}$ to rank the pair-wise feature-based semantic distance scores between the new image and each training image in $\mathcal{T}^{(k)}$, resulting in a set of ranked pair-wise feature-based semantic distance scores for $\mathcal{T}^{(k)}$ given by $\{d_1^{(k)}, d_2^{(k)}, \ldots, d_{n_k}^{(k)}\}$, wherein $d_i^{(k)}$ is the pair-wise feature-based semantic distance score between the new image and the i-th training image in the ranking list;
- computing the cluster-specific vector $w^{(k)}$ of probabilistic annotations as $$w^{(k)} = \frac{1}{n_k} \sum_i \frac{d_1^{(k)} - \alpha^{(k)}}{d_i^{(k)} - \alpha^{(k)}} * t_i^{(k)},$$

wherein $\alpha^{(k)}$ is a prescribed coefficient; and
normalizing $w^{(k)}$.

14. The process of claim 13, wherein $\alpha^{(k)}$ is set such that $$\frac{d_1^{(k)} - \alpha^{(k)}}{d_5^{(k)} - \alpha^{(k)}} = 0.5.$$

15. The process of claim 13, wherein $w^{(k)}$ is normalized such that the L-1 norm of $w^{(k)}$ is one.

16. The process of claim 1, wherein, the plurality of semantic clusters $\mathcal{T}^{(k)}$ of training images comprises H different clusters, the vector w of final keyword annotations for the new image is given by the equation $$w = \sum_{i=1}^{H} p(i) * w^{(i)},$$

and

* denotes an element-wise product between vectors.

17. A computer-implemented process for comparing the annotation precision of two different automatic image annotation (AIA) algorithms, comprising using a computing device to perform the following process actions:

inputting a set T of images;

manually applying ground-truth keyword annotations to each image in T, wherein T comprises a total number of images given by n;

utilizing a first AIA algorithm to automatically generate first keyword annotations for each image in T;

utilizing a second AIA algorithm to automatically generate second keyword annotations for each image in T;

computing a first pair-wise semantic distance score SD( ) for each image in T, wherein said first score SD( ) specifies a metric for a semantic distance between the first keyword annotations and the ground-truth keyword annotations;

computing a second pair-wise semantic distance score SD( ) for each image in T, wherein said second score SD( ) specifies a metric for the semantic distance between the second keyword annotations and the ground-truth keyword annotations; and generating a semantic relative comparative score (RCS) which compares the annotation precision of the first and second AIA algorithms by first determining a number of images in T for which the first score SD( ) is less than the second score SD( ), and then dividing said number of images by n.

18. The process of claim 17, wherein, whenever the semantic RCS is greater than 0.5 the annotation precision of AIA algorithm 1 is greater than that of AIA algorithm 2, whenever the semantic RCS is less than 0.5 the annotation precision of AIA algorithm 2 is greater than that of AIA algorithm 1, and whenever the semantic RCS is equal to 0.5 the annotation precision of AIA algorithms 1 and 2 is the same.

19. The process of claim 17, wherein the pair-wise semantic distance score SD( ) for a each image in T is given by the equation $$SD(t^G, t^A) = \frac{1}{2n_1} \sum_{i=1}^{n_1} \min_{j} SD(t_i^G, t_j^A) + \frac{1}{2n_2} \sum_{j=1}^{n_2} \min_{i} SD(t_i^G, t_j^A),$$

wherein, $t^G$ is a vector of the ground-truth keyword annotations for the image, $n_1$ is a total number of keywords in $t^G$, and $t_i^G$ is a particular keyword in $t^G$, $t^A$ is a vector of either the first or second keyword annotations which were automatically generated for the image, $n_2$ is a total number of keywords in $t^A$, and $t_j^A$ is a particular keyword in $t^A$, a Jiang and Conrath (JCN) keyword similarity measure JCN( ) is employed to compute $SD(t_i^G, t_j^A)$, and $SD(t_i^G, t_j^A)$ is given by the equation $$SD(t_i^G, t_j^A) =$$

$$\begin{cases} 1 & \text{for } JCN(t_i^G, t_j^A) \leq 0.06 \\ 0.6 - 0.4\sin\left(\frac{25\pi}{2} JCN(t_i^G, t_j^A) + \frac{3}{4}\pi\right) & \text{for } 0.06 < JCN(t_i^G, t_j^A) < 0.1 \\ 0.6 - 0.6\sin\left[\frac{\pi}{2}\left(1 - \frac{1}{3.471 JCN(t_i^G, t_j^A) + 0.653}\right)\right] & \text{for } JCN(t_i^G, t_j^A) \geq 0.1 \end{cases}$$

20. A computer-implemented process for automatically annotating a new image, comprising using a computing device to perform the following process actions:

inputting a set $\mathcal{T}$ of training images, wherein the new image is not in $\mathcal{T}$;

manually annotating each training image in $\mathcal{T}$ with a vector of annotations comprising one or more textual keywords, wherein each keyword describes a different low-level visual feature in the image;

computing a pair-wise annotation-based semantic distance score between every possible pair of training images in $\mathcal{T}$;

utilizing a constant shift embedding framework to embed the training images in $\mathcal{T}$ into a Euclidean vector space;

utilizing an x-means algorithm to group the embedded training images into H different semantic clusters $\mathcal{T}^{(k)}$ of training images based upon the annotation-based scores, wherein k is a variable which uniquely identifies each cluster $\mathcal{T}^{(k)}$;

for each semantic cluster $\mathcal{T}^{(k)}$ of training images, generating a set of relaxed relative comparison constraints $\mathcal{R}$ for $\mathcal{T}^{(k)}$, wherein $\mathcal{T}^{(k)}$ is given by the equation $\mathcal{T}^{(k)} = \{x_i^{(k)}\}_{i=1}^{n_k}$, $x_i^{(k)}$ is a feature vector for the i-th training image in $\mathcal{T}^{(k)}$, $n_k$ is a number of training images in $\mathcal{R}$ is given by the equation $\mathcal{R} = \{(x_a, x_b, x_c)\}$, and $(x_a, x_b, x_c)$ is a subset of all the possible triples of training images in $\mathcal{T}^{(k)}$ which satisfies either, a first condition in which the intuitive semantic distance between $x_a$ and $x_c$ is greater than said distance between $x_a$ and $x_b$, or a second condition in which the intuitive semantic distance between $x_a$ and $x_c$ equals said distance between $x_a$ and $x_b$ but the difference between the features in $x_a$ and the features in $x_c$ is greater than the difference between the features in $x_a$ and the features in $x_b$, randomly sampling a prescribed number m of the constraints from $\mathcal{R}$ resulting in a subset of relaxed relative comparison constraints for $\mathcal{T}^{(k)}$ given by $\mathcal{R}_i$ (i=1, ..., m), training m different pair-wise semantic distance functions (SDFs) $\{f_1^{(k)}, ..., f_m^{(k)}\}$ for $\mathcal{T}^{(k)}$, wherein each pair-wise SDF $f_i^{(k)}$ is trained using $\mathcal{R}_i$, generating an SDF $f^{(k)}$ for $\mathcal{T}^{(k)}$ by computing an average of the m different pair-wise SDFs $\{f_1^{(k)}, ..., f_m^{(k)}\}$, utilizing $f^{(k)}$ to compute a pair-wise feature-based semantic distance score between the new image and each training image in $\mathcal{T}^{(k)}$, resulting in a set of pair-wise feature-based semantic distance scores for $\mathcal{T}^{(k)}$, utilizing the set of pair-wise feature-based semantic distance scores for $\mathcal{T}^{(k)}$ to generate a ranking list for $\mathcal{T}^{(k)}$, wherein said list ranks each training image in $\mathcal{T}^{(k)}$ according to its intuitive semantic distance from the new image, generating a probability density function (PDF) which estimates the visual features in the training images in $\mathcal{T}^{(k)}$, utilizing the PDF to estimate a cluster association probability p(k) for $\mathcal{T}^{(k)}$, wherein p(k) specifies a probability of the new image being semantically associated with $\mathcal{T}^{(k)}$, utilizing the ranking list for $\mathcal{T}^{(k)}$ to rank the vectors of annotations for all the training images in $\mathcal{T}^{(k)}$, resulting in a set of ranked annotations for $\mathcal{T}^{(k)}$ given by $\{t_1^{(k)}, t_2^{(k)}, ..., t_{n_k}^{(k)}\}$, wherein $t_i^{(k)}$ is the vector of annotations for the i-th training image in the ranking list, utilizing the ranking list for $\mathcal{T}^{(k)}$ to rank the pair-wise feature-based semantic distance scores between the new image and each training image in $\mathcal{T}^{(k)}$, resulting in a set of ranked pair-wise feature-based semantic distance scores for $\mathcal{T}^{(k)}$ given by $\{d_1^{(k)}, d_2^{(k)}, ..., d_{n_k}^{(k)}\}$, wherein $d_i^{(k)}$ is the pair-wise feature-based semantic distance score between the new image and the i-th training image in the ranking list, computing a cluster-specific vector $w^{(k)}$ of probabilistic annotations for the new image as $$w^{(k)} = \frac{1}{n_k} \sum_i \frac{d_1^{(k)} - \alpha^{(k)}}{d_i^{(k)} - \alpha^{(k)}} * t_i^{(k)},$$

wherein $\alpha^{(k)}$ a prescribed coefficient and * denotes an element-wise product between vectors, and normalizing $w^{(k)}$; and utilizing p(k) and $w^{(k)}$ for all the semantic clusters $\mathcal{T}^{(k)}$ of training images to generate a vector w of final annotations for the new image given by the equation $$w = \sum_{i=1}^{H} p(i) * w^{(i)}.$$

* * * * *

UNITED STATES PATENT AND TRADEMARK OFFICE
CERTIFICATE OF CORRECTION

PATENT NO. : 7,890,512 B2
APPLICATION NO. : 12/136773
DATED : February 15, 2011
INVENTOR(S) : Tao Mei et al.

It is certified that error appears in the above-identified patent and that said Letters Patent is hereby corrected as shown below:

In column 20, line 32, in Claim 5, delete " $\mathcal{T}^{(k)}$ " and insert -- $\mathcal{T}$ --, therefor.

In column 20, line 61, in Claim 7, delete "for $0.06 < JCN(a_i, b_j) < 0.1$," and insert -- for $0.06 < JCN(a_i, b_j) < 0.1.$ --, therefor.

In column 22, line 43, in Claim 13, delete " $\mathcal{R}$ " and insert -- $\mathcal{T}^{(k)}$ , --, therefor.

In column 24, line 13, in Claim 19, delete " $t_i^A$ " and insert -- $t_j^A$ --, therefor.

In column 24, line 25, in Claim 19, delete "for $0.06 < JCN(t_i^G, t_j^A) < 0.1$," and insert -- for $0.06 < JCN(t_i^G, t_j^A) < 0.1.$ --, therefor.

Signed and Sealed this
Twenty-sixth Day of July, 2011

David J. Kappos
*Director of the United States Patent and Trademark Office*